United States Patent
Yi

(10) Patent No.: US 6,778,187 B1
(45) Date of Patent: Aug. 17, 2004

(54) METHODS AND DEVICES TO PROCESS GRAPHICS AND/OR VIDEO DATA

(75) Inventor: You-Wen Yi, Milpitas, CA (US)

(73) Assignee: Oak Technology, Inc., Sunnyvale, CA (US)

( * ) Notice: Subject to any disclaimer, the term of this patent is extended or adjusted under 35 U.S.C. 154(b) by 0 days.

(21) Appl. No.: 09/473,255

(22) Filed: Dec. 27, 1999

(51) Int. Cl.[7] .............................. G06T 9/00; G09G 5/02
(52) U.S. Cl. ...................................... 345/605; 345/555
(58) Field of Search ................................ 345/600, 605, 345/555; 348/386.1, 391.1; 382/232; 375/240.01

(56) References Cited

U.S. PATENT DOCUMENTS

| 5,081,450 | A | * | 1/1992 | Lucas et al. |
| 5,237,316 | A | * | 8/1993 | Cox, Jr. et al. |
| 5,894,300 | A | * | 4/1999 | Takizawa |
| 5,909,219 | A | * | 6/1999 | Dye ............................ 345/553 |
| 6,009,191 | A | * | 12/1999 | Julier |
| 6,366,289 | B1 | * | 4/2002 | Johns .......................... 345/543 |
| 6,427,029 | B1 | * | 7/2002 | Kono et al. .................. 382/233 |
| 6,690,810 | B2 | * | 2/2004 | Ito ............................... 382/232 |

* cited by examiner

Primary Examiner—Jeffery Brier
(74) Attorney, Agent, or Firm—Young Law Firm, P.C.

(57) ABSTRACT

Methods and devices for compressing and uncompressing three color component graphics and/or digital video data for storage to and retrieval from a reduced memory space, while allocating memory space for pixel data special attribute, such as a transparency attribute. 24 bit video data, for example, may be compressed and stored along with 2 bits of transparency data in a 16-bit memory space, without undue loss of fidelity relative to the original graphics and/or video data. The stored and compressed video data may be uncompressed and a correction factor may be selectively applied to each of the three component pixel data. The resulting uncompressed pixel data matches or closely resembles the video data prior to compression and storage. The correction factor may vary depending upon the color space of the graphics and/or video pixel data.

24 Claims, 5 Drawing Sheets

METHODS AND DEVICES TO PROCESS GRAPHICS AND/OR VIDEO DATA

BACKGROUND OF THE INVENTION

1. Field of the Invention

This invention relates to devices and methods to process graphics and/or video data. More particularly, the present invention relates to improved devices and methods for compressing, storing, retrieving and uncompressing graphics and/or digital video data for display on a graphics and/or video display device.

2. Description of the Related Art

Low-end graphics and digital video, whether displayed on computer display terminals or television monitors, may utilize 8 bits per picture element (hereafter pixel). The use of 8 bits per pixel allows a maximum of 256 colors, which is often insufficient to accurately render the images to be displayed. Higher end graphics and digital video, on the other hand, may utilize 32 bits per pixel. In the red, green, blue (hereafter RGB) color space, 8 bits of the 32 bits per pixel are conventionally assigned to each of the three color components: 8 bits for each of the R, G and B color components. The remaining 8 bits of the 32 bits per pixel may be assigned to a special attribute, such as the transparency attribute. Use of the transparency attribute allows one graphics window, for example, to fade into another graphics window in a smooth manner or allows graceful fade ins or fade outs in digital video. Using 8 bits for the transparency attribute allows for 256 transparency levels. However, the use of 8 bits for each of the color components and 8 bits for the transparency attribute places great demands upon the graphics and/or video processing hardware. Indeed, a simple computation reveals that to store a relatively small 720×480 pixel graphics image using 32 bits per pixel requires 720×480×32 bits, or about 11 Mb of memory space. The demands placed upon the graphics and video processing hardware are even greater in the case of full motion video, as three video frames are often required to be temporarily stored in memory at any given time as part of the decompression process. There is, therefore, a need to reduce the memory requirements to process complex graphics and digital video data streams.

The memory, typically, may include a dynamic random access memory (hereafter DRAM) that may be external to the graphics and video processor. The graphics and digital video, therefore, must be transferred into and out of the external DRAM in a sufficiently rapid manner as to keep pace with the rate of the incoming and output data. Thus, the bandwidth of the graphics processor—external memory interface is also a significant consideration in the design of graphics and/or digital video processing devices. There is also a need, therefore, to devise methods and devices that reduce the need for high-bandwidth interfaces between the graphics processor and the external graphics/video DRAM. Ideally, such methods and devices should allow for the accurate representation of images with many colors (greater than 256, for example) without sacrificing the use of the transparency or other special attribute, all the while reducing the memory and bandwidth requirements of the graphics processing hardware.

SUMMARY OF THE INVENTION

The present invention, therefore, provides devices and methods for processing graphics and/or digital video that reduce the memory and bandwidth requirements of the graphics and video processing hardware, without unduly sacrificing image quality.

In accordance with the principles of the invention above and those that will be mentioned and will become apparent below, a method of processing graphics or digital video data, according to an embodiment of the present invention, comprises the steps of determining a source depth of each color component of a pixel of the data; selecting a stored depth of each color component of the pixel; selecting a stored depth of a special attribute for the pixel and compressing the color components of the pixel. The compressing step is carried out by performing a right shifting operation on each group of bits representing each color component by right shifting by a first number of bits equal to a difference between the source depth and the stored depth and transforming each right shifted group of bits by stripping all but a second number of least significant bits from each right shifted group, the second number being equal to the stored depth. A third number of bits is assigned to the special attribute, the third number being no greater than the selected stored depth of the special attribute. Each of the compressed color components of the pixel and the special attribute are then concatenated as concatenated pixel data and the concatenated pixel data is stored in a memory.

According to further embodiments, the concatenated pixel data may be retrieved from the memory and the retrieved concatenated pixel data may be uncompressed by left shifting each transformed group of the compressed data by a fourth number of bits and adding a correction factor thereto, the fourth number being equal to the difference between a selected read out depth and the stored depth. The correction factor may be selected so that the uncompressed data substantially matches the data prior to compression. The correction factor may be equal to a fifth number, the fifth number being equal to zero or 2 raised to the difference between the selected read out depth and the stored depth. The read out depth may be selected to be equal to the source depth of the data.

The color space of the data may be RGB. In that case, the determining, selecting, compressing and storing steps may be carried out for each of the R, G and B color components of the data. Alternatively, the color space of the data may be YCbCr and the determining, selecting, compressing and storing steps may then carried out for each of the Y, Cb and Cr color components of the data.

The color space of the data may be either YUV or YCbCr and the correction factor for the Cb, Cr, U and V components may be zero. The special attribute may represent or include pixel transparency data, for example.

The present invention is also a method of processing 24-bit digital video or graphics data, comprising the steps of allocating a 16 bit memory space of a memory to store each pixel of the 24-bit data; reducing a bit length of each color component of each pixel of the 24 bit data; allocating at least one bit within the 16 bit memory space to represent a special attribute distinct from the three bit-length reduced color components of each pixel of the 24-bit data; concatenating the bit length-reduced color components of each pixel and the special attribute as concatenated pixel data; storing the concatenated pixel data in the 16 bit memory space. The special attribute may include transparency data.

The color space of the 24-bit data may be RGB. In that case, the bit length reducing step may reduce an 8-bit red color component of the 24-bit data to 5 bits, an 8-bit green color component of the 24-bit data to 5 bits and an 8-bit blue color component of the 24-bit data to 4 bits and the allocating step may allocate 2 bits to the special attribute. Alternatively, the bit length reducing step may reduce an 8-bit red color component of the 24-bit data to 4 bits, an 8-bit green color component of the 24-bit data to 5 bits and an 8-bit blue color component of the 24-bit data to 4 bits and the allocating step may allocate 3 bits to the special attribute. The bit length reducing step may reduce an 8-bit red color component of the 24-bit data to 4 bits, an 8-bit green color component of the 24-bit data to 5 bits and an 8-bit blue color component of the 24-bit data to 3 bits and the allocating step may allocate 4 bits to the special attribute.

The color space of the 24-bit data may be YCbCr. In that case, the bit length reducing step may reduce an 8-bit Y color component of the 24-bit data to 5 bits, an 8-bit Cb color component of the 24-bit data to 5 bits and an 8-bit Cr color component of the 24-bit data to 4 bits and the allocating step may allocate 2 bits to the special attribute. The bit length reducing step may reduce an 8-bit Y color component of the 24-bit data to 5 bits, an 8-bit Cb color component of the 24-bit data to 4 bits and an 8-bit Cr color component of the 24-bit data to 5 bits and the allocating step may allocate 2 bits to the special attribute. The bit length reducing step may reduce an 8-bit Y color component of the 24-bit data to 6 bits, an 8-bit Cb color component of the 24-bit data to 4 bits and an 8-bit Cr color component of the 24-bit data to 4 bits and the allocating step may allocate 2 bits to the special attribute. The bit length reducing step may reduce an 8-bit Y color component of the 24-bit data to 6 bits, an 8-bit Cb color component of the 24-bit data to 4 bits and an 8-bit Cr color component of the 24-bit data to 3 bits and the allocating step may allocate 3 bits to the special attribute. The bit length reducing step may reduce an 8-bit Y color component of the 24-bit data to 6 bits, an 8-bit Cb color component of the 24-bit data to 3 bits and an 8-bit Cr color component of the 24-bit data to 4 bits and the allocating step may allocate 3 bits to the special attribute.

When the color space is RGB, the method may further include the steps of reading the bits stored in the 16 bit memory space; appending a 1 bit to the bits read from memory in a least significant bit position and appending at least one 0 bit to the appended 1 bit. When the color space is YCbCr, the method may further include the steps of reading the bits stored in the 16 bit memory space; appending, for the bits representing the color component corresponding to a Y component, a 1 bit to the bits read from memory in a least significant bit position and appending at least one 0 bit to the appended 1 bit; and appending, for the respective bits representing the color component corresponding to the Cb and Cr components, at least two 0 bits to the bits read from memory in a least significant bit position.

The present invention is also a three color component digital video and/or graphics data processing device, comprising a digital video and graphics data receiver, the receiver being adapted to receive data having a first number of bits assigned to transparency data and a second number of bits assigned to each of the three color components of the received data; dynamic random access memory; and a graphics processor coupled to the receiver and to the memory. The graphics processor includes logic to compress the data received from the receiver by reducing a number of bits allocated to represent pixel data in each of the three color components; store the transparency data and the compressed data in the memory; selectively retrieve the stored data from memory; and uncompress the retrieved data by selectively appending at least two least significant bits onto the retrieved data for each of the three color components, the appended bits representing a correction factor selected so that the uncompressed data substantially matches the data prior to compression.

BRIEF DESCRIPTION OF THE DRAWINGS

For a further understanding of the advantages of the present invention, reference should be made to the following detailed description, taken in conjunction with the accompanying figures, in which.

DESCRIPTION OF THE INVENTION

Figure 1:
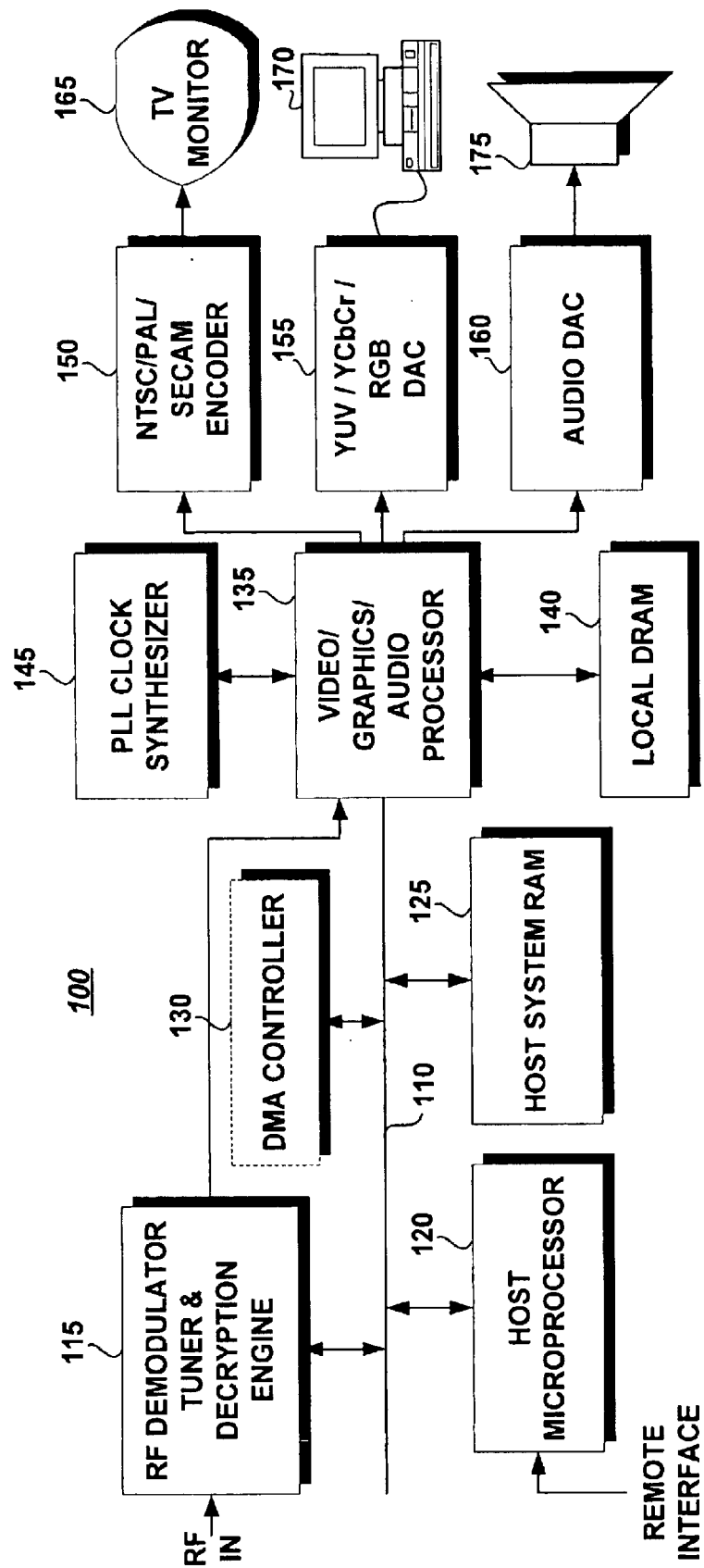
FIG. 1 is a block diagram of a system for processing graphics and/or digital video streams suitable for implementing the present invention.

FIG. 1 shows a system 100 for processing graphics and/or digital video streams suitable for implementing the present invention. As shown in FIG. 1, the system 100 may include a bus 110 to which a number of devices may be coupled. A host microprocessor 120 may be coupled to the bus 110 and may receive user input from a remote interface. The host microprocessor 120 (such as, for example, microprocessors belonging to the Intel 80XX or Motorola MC680XX family of processors) controls aspects of the operation of the system 100. A receiver 115 (including, for example, an RF demodulator, tuner and a decryption engine) may be coupled to the bus 110, to receive a signal (e.g., an RF signal) input thereto. The signal input to the receiver 115 may, for example, include video data and/or graphics data. The host system RAM 125 may also be coupled, via a suitable interface, to the bus 110 and accessed by the host microprocessor 120. Direct memory accesses may be controlled by the optional DMA controller 130, shown in dashed lines in FIG. 1. A graphics processor 135 may also be coupled to the bus 110. The graphics processor 135 may provide real time processing, decoding and decompression of, for example, Moving Picture Expert Group (hereafter MPEG) 1 and 2 video streams and/or other graphics and/or video/audio standards from the Consultative Committee for International Telegraphy and Telephony (hereafter CCITT), among other standard-setting organizations. The graphics processor 135 may also provide the requisite address generation for and control of the local graphics processor DRAM 140, provide the necessary interrupt scheme and schedule the movement of graphics and/or video data into and out of the DRAM 140. The DRAM 140 may, for example, be at least 16 Mbits in size for National Television Standards Committee (NTCS)-based applications, at least 24 Mbits in size for Phase Alternate Line (PAL)-based applications. The graphics processor 135 may be synchronized by an external clock source and/or by an internal Phase Locked Loop (PLL) circuit 145 which takes an input from, for example, an external clock signal, a video pixel clock, an audio clock, a Digital Versatile Disk (hereafter DVD) or Compact Disk (hereafter CD) Digital Signal Processing clock. The video and/or graphics pixel data output from the graphics processor 135 may be directly input to a television encoder, such as an NTSC or PAL encoder 150, such encoders being known in the art. Alternatively, the pixel data from the graphics processor 135 may be input to an encoder such as shown at 150 adapted to encode the pixel data stream according to the Systeme Electronique Couleur Avec Memoire (SECAM), the color TV standard in France and Russia. Alternatively still, the pixel data from the graphics processor 135 may be converted for display on a standard RGB, YUV (initially developed for PAL video, now also implemented in the CCIR standard for digital video) or YCbCr (a scaled and shifted version of YUV) computer monitor 170 by the digital to analog converter 155. Digital audio data output from the graphics processor 135 may also be converted to analog form and sent to a speaker system symbolized at reference numeral 175.

Figure 2:
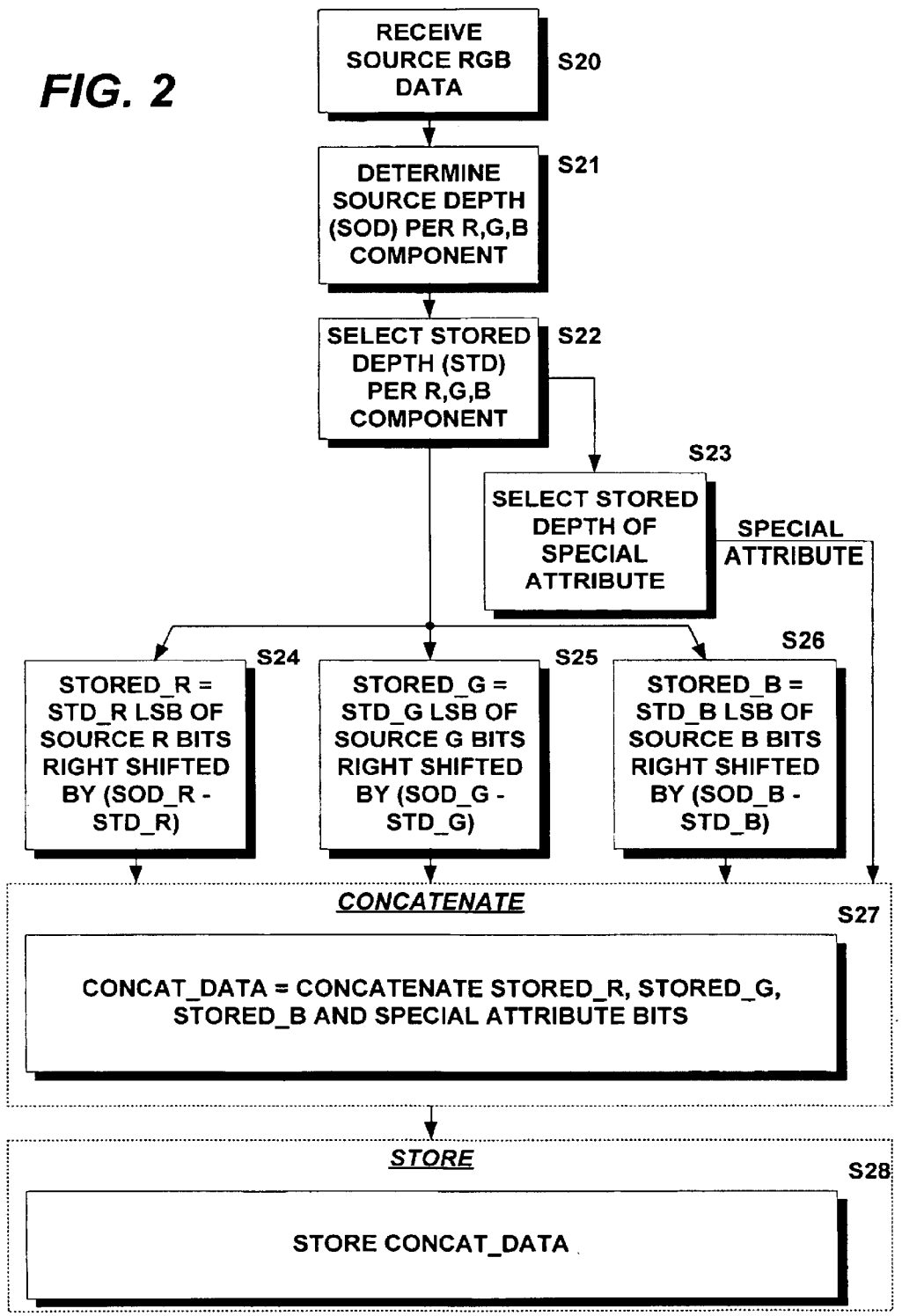
FIG. 2 is a flow chart of a method of compressing and storing graphics and/or video data in a memory, according to an embodiment of the present invention.
Figure 3:
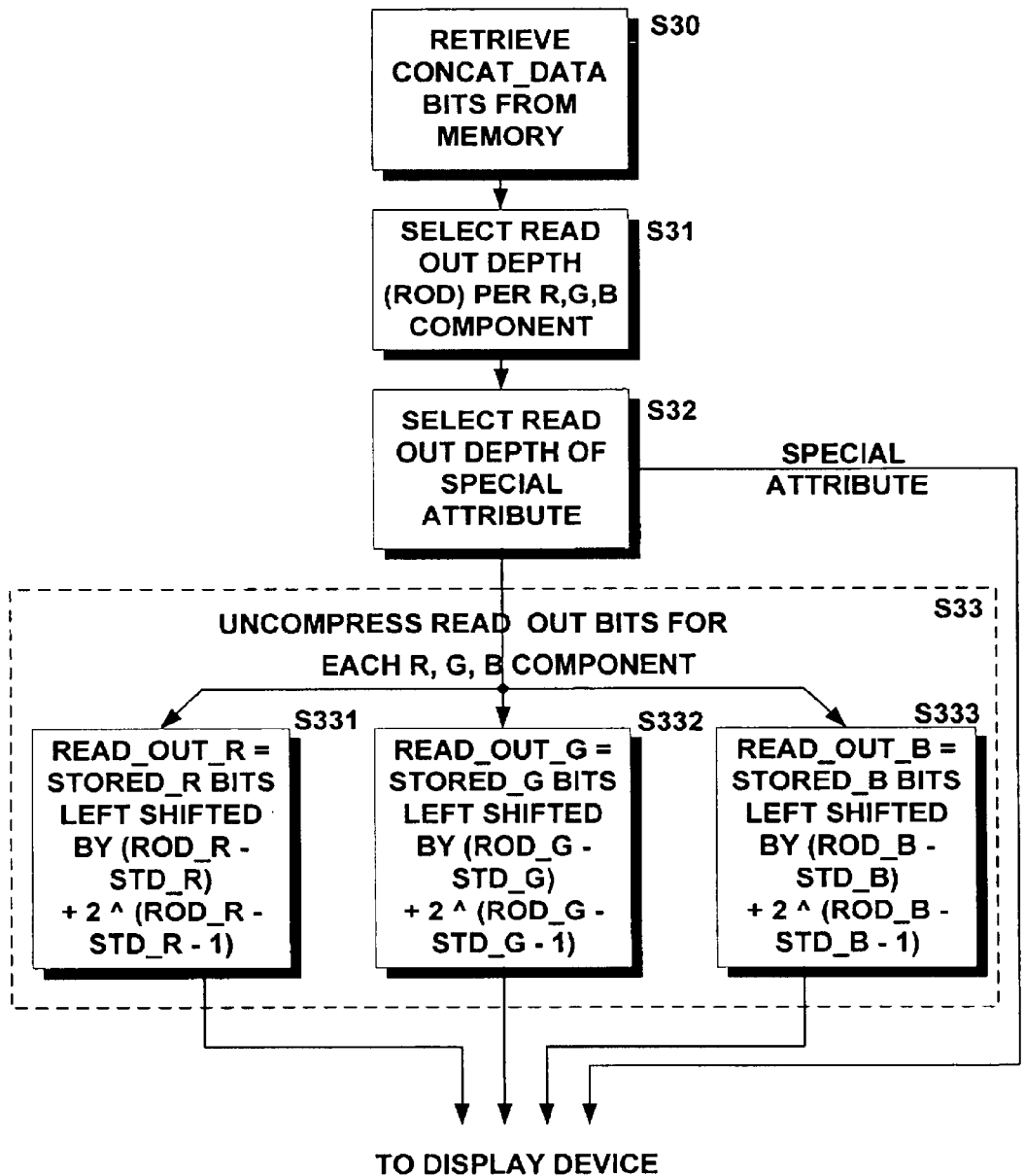
FIG. 3 is a flow chart of a method of decompressing and displaying stored graphics and/or video data, according to an embodiment of the present invention.
Figure 4:
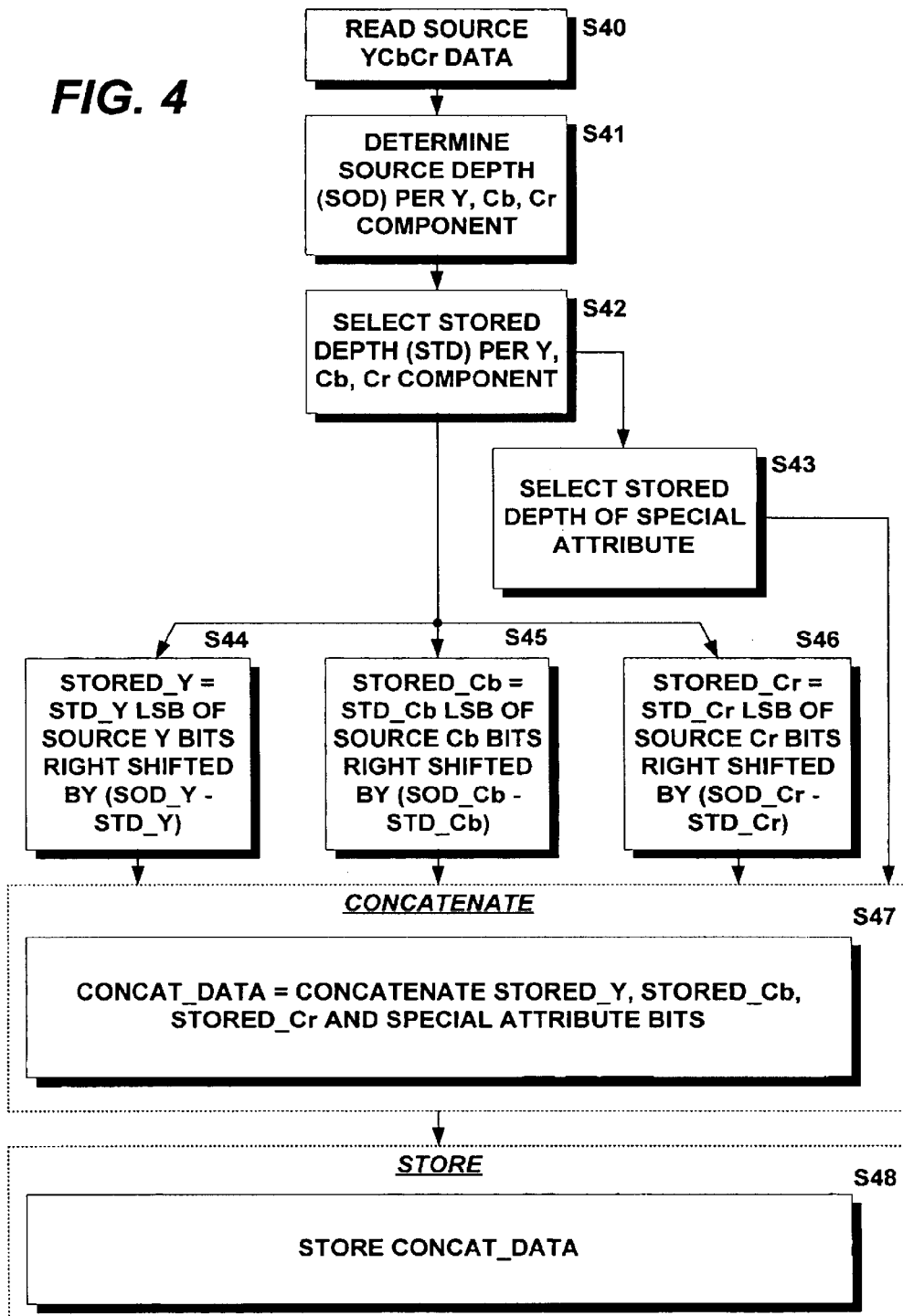
FIG. 4 is a flow chart of another method of compressing and storing graphics and/or video data in a memory, according to a further embodiment of the present invention.
Figure 5:
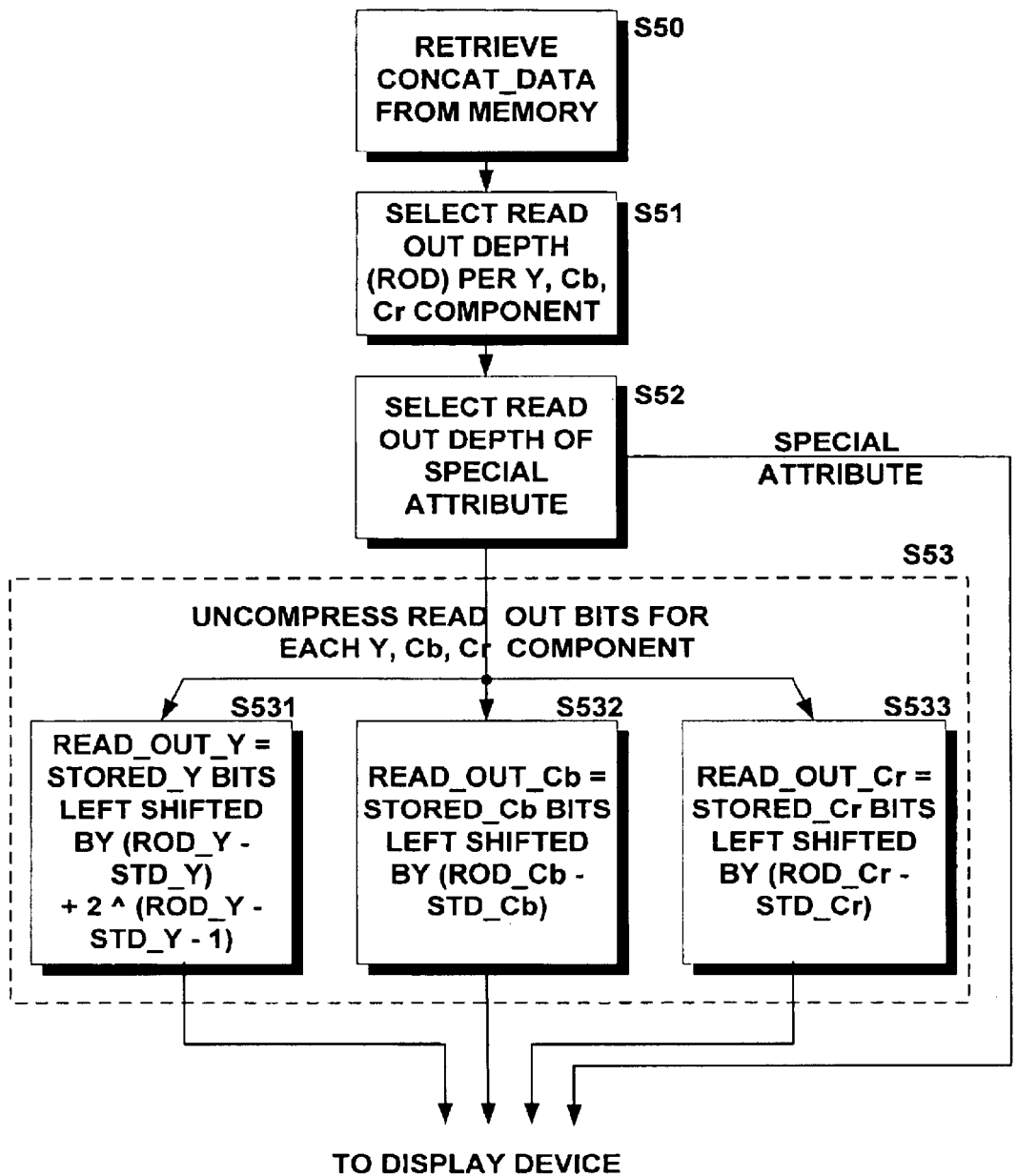
FIG. 5 is a flow chart of another method of decompressing and displaying stored graphics and/or video data, according to a further embodiment of the present invention.

In FIGS. 2 and 3, aspects of the present invention are presented in terms of the RGB color space, whereas FIGS. 4 and 5 applies the present invention to YUV or YCbCr color space. It will become apparent; moreover, that the present invention is also applicable to other graphics and/or video formats, the present invention not being limited to any one such format. FIG. 2 is a flow chart of a method of compressing and storing graphics and/or video data in a memory (such as DRAM 140 in FIG. 1) according to an embodiment of the present invention. The source RGB data is received in step S20. Step S21 calls for the determination of the source depth (SOD) per R, G and B component. The source RGB data may include, for illustrative and exemplary purposes only, 8 bits per color component per pixel, or 24 bits for all three color components. The SOD of the source RGB data is the number of bits per color component. In the example introduced immediately above, therefore, the SOD for the source RGB data is 8. In step S22, the stored depth (STD) per R, G and B component is selected. According to the present invention, the STD is the number of bits per color component to be stored in the local graphics processor buffer, such as the DRAM 140 in FIG. 1. To lessen the memory size and bandwidth requirements of the system 100 (or a similar system to process graphics and/or digital video), the STD may be selected to be a smaller number than then SOD. For example, given an SOD of 8 bits, the STD may be selected to be a number smaller than 8, such as 5. The STD for each of the R, G and B components may be identical or may be dissimilar from one another. For example, addressing within the graphics processor DRAM may be facilitated by selecting a 16-bit memory space to store the pixel data of the graphics image and/or to store the pixel data of the source RGB digital video stream. In that case, for example, the STD for the R component (hereafter STD_R) may be selected to be 5 bits in length, the STD for the G component (hereafter STD_G) may also be selected to be 5 bits in length, whereas the STD for the B component (hereafter STD_B) may be selected to be, for example, 4 bits in length. The sum of STD_R, STD_G and STD_B, in this example, is 14 bits. If the pixel data is to be stored in a memory space 16 bits wide in the DRAM 140, this leaves 2 bits free to store some other special attribute. According to one embodiment of the present invention, this special attribute may be selected to represent pixel transparency data. The 2 bits of transparency data, therefore, allow for 4 transparency levels, ranging from 0% transparency (opaque) to 100% transparency (fully transparent), such as 0%, 50%, 75% and 100%, for example. A greater number of transparency bits may be stored within the 16-bit memory space of the current example, but will require fewer bits to be stored to represent one or more of the color components. Alternatively, other pixel data may be stored in place of the transparency data. Step S23, therefore, call for the selection of the stored depth of the selected special attribute.

Steps S24–S26 may be carried out sequentially, in parallel, or in parallel across color components. Steps S24, S25 and S26 are similar, differing only in the color component being operated upon. Indeed, step S24 operates upon the pixel data for the R color component, step S25 operates upon the pixel data for the G color component whereas step S26 operates upon the pixel data for the B color component. Steps S24, S25 and S26 compress the source RGB data and determine the pixel data to be stored in the memory 140 for each color component, in the following fashion. As shown in step S24, the R component data to be stored in the memory 140 (hereafter STORED_R) is determined by taking the STD_R least significant bits (hereafter LSB) of the R component source data after the R component source data is shifted by a number of bits equal to the difference of SOD_R and STD_R. Step S25 calls for the determination of the G component of the source data to be stored in the memory 140 (hereafter STORED_G) by taking the STD_G LSB of the G component source data after the G component source data is shifted by a number of bits equal to the difference of SOD_G and STD_G. Similarly, Step S26 calls for the determination of the B component of the source data to be stored in the memory 140 (hereafter STORED_B) by taking the STD_B LSB of the B component source data after the B component source data is shifted by a number of bits equal to the difference of SOD_B and STD_B. In step S27 the STORED_R, STORED_G and STORED_B bits determined in steps S25, S26 and S27 respectively, are concatenated with the special attribute bits of step S23 to form CONCAT_DATA bits, as shown in step S27. The CONCAT_DATA bits are then stored in the memory 140, as shown in steps S28. Therefore, the CONCAT_DATA bits form the pixel data (color component data concatenated with the special attribute data) stored in memory.

For example, using the example of SOD_R=SOD_G= SOD_B=8 bits, and STD_R=5 bits, STD_G=5 bits, STD_B=4 bits (decreasing the range of blue chrominance is less noticeable to the human eye than decreasing the range of either the red or green chrominance) and a stored depth for the transparency data of 2 bits, the pixel data for each color component, according to an embodiment of the present invention, may be determined as follows:

| | | |
|---|---|---|
| STORED_R | = | 5 LSB of source R bits right shifted by (SOD_R − STD_R); |
| | = | 5 LSB of source R bits right shifted by (8 − 5); |
| | = | 5 LSB of source R bits right shifted by 3 |

If, for example, the source R bits are equal to the binary number b1110 1011, then the source R bits, according to the present invention, may be compressed into the binary number represented by STORED_R=5 LSB of (b1110 1011>>8−5), where the ">>" symbol is the right shift operator. STORED_R, therefore, equals 5 LSB (b0001 1101) or the binary number b1 1101. The source R pixel data b1110 1011, therefore, may be represented in the memory 140, in this example, as b1 1101. In this example, the binary value for the R pixel data stored in the memory 140 may be (2-bit) special attribute bits concatenated with the bit-length reduced value of b1 1101

To display the pixel data on a television monitor, computer monitor or other display device, it is necessary to retrieve the CONCAT_DATA pixel data (that includes the color component data and the special attribute data) from memory and to uncompress the retrieved pixel data for each of the R, G and B color components. FIG. 3 is a flowchart illustrating a method of uncompressing the compressed pixel data stored in memory, according to an embodiment of the present invention. As shown therein, step S30 calls for the retrieval of the CONCAT_DATA bits from memory. In step S31, the read out depth for each R, G and B color component (hereafter ROD_R, ROD_G and ROD_B) is selected. According to an embodiment of the present invention, the ROD_R=SOD_R, ROD_G=SOD_G and ROD_B=SOD_B, although other implementations are possible within the scope of the present invention. The read out depth, according to the present invention, is the number of bits per color component or the number of bits of the transparency data of the uncompressed pixel data to be sent to the computer monitor or encoded and sent to another display device. Step S32 calls for the selection of the read out depth of the special attribute, such as the transparency data. According to an embodiment of the present invention, the read out depth of the special attribute is equal to the stored depth thereof, although other implementations are possible.

The read out bits for each of the R, G and B color components are then uncompressed, as shown at step S33. For example, the pixel data may then be uncompressed in the manner specified in steps S331, S332 and S333 of step S33. As shown in step S331, the pixel data to be read out per color component (referenced by READ_OUT_R, READ_OUT_G and READ_OUT_B in FIG. 3) may be determined by left shifting the retrieved color component pixel data by a number of bits specified by the difference between the ROD and the STD for that color component and adding a correction factor thereto. The correction factor, according to the present invention, may be selected so that the uncompressed pixel data substantially matches the pixel data prior to compression. As shown in step S331 drawn to the uncompression of the stored R component pixel data, the READ_OUT_R bits may be determined by left shifting the bit quantity STORED_R by a number of bits equal to (ROD_R−STD_R) and adding a correction factor thereto equal to zero or $2^{(ROD\_R-STD\_R-1)}$. Similarly, as shown in step S332 drawn to the uncompression of the stored G component pixel data, the READ_OUT_G bits may be determined by left shifting the bit quantity STORED_G by a number of bits equal to (ROD_G−STD_G) and adding a correction factor thereto to equal to zero or $2^{(ROD\_G-STD\_G-1)}$. Lastly, as shown in step S333, drawn to the uncompression of the stored B component pixel data, the READ_OUT_B bits may be determined by left shifting the bit quantity STORED_B by a number of bits equal to (ROD_B−STD_B) and adding a correction factor thereto equal to zero or $2^{(ROD\_B-STD\_B-1)}$. The READ_OUT_R, READ_OUT_G, READ_OUT_B and the transparency bits of step S32 (or other special pixel data attribute) may be input directly to an RGB computer monitor after being converted to analog form or suitably encoded (see FIG. 1, reference numeral 150) for later display on a television monitor, for example.

Continuing with the example developed relative to FIG. 2, the STORED_R bits (b1 1101) may be retrieved as called for in step S30 and ROD_R may be selected to be 8 bits, to match the source depth SOD for the R color component, although another read out depth may be selected. The READ_OUT_R bits, in this example, would be determined by:

| | | |
|---|---|---|
| READ_OUT_R | = | b1 1101 left shifted by (ROD_R − STD_R) + $2^{(ROD\_R-STD\_R-1)}$; |
| | = | b1 1101 left shifted by (8 − 5) + $2^{(8-5-1)}$; |
| | = | b1 1101 left shifted by 3 + b100; |
| | = | b1110 1000 + b100; |
| | = | b1110 1100 |

Therefore, the source pixel data for the R color component of b1110 1011 (decimal 235) has been compressed (FIG. 2) and uncompressed (FIG. 3) to a value of b1110 1100 (decimal 236) that is very close to its original magnitude. Therefore, the original 24-bit (8 bit per color component) pixel data and the 2 bit transparency data (four transparency levels) has been compressed to fit within a 16-bit memory space and uncompressed to a value that is very close to its magnitude prior to compression. Although the method disclosed above may not restore the same pixel values before and after compression in all cases, the difference between the pixel values before and after compression are believed to be sufficiently small as to be scarcely noticeable or not noticeable at all in the displayed graphics image or digital video. The determination of the correction factor may be also be carried out by appending a 1 bit to the color component bits read from memory in a least significant bit position and appending at least one 0 bit to the appended 1 bit. Indeed, prior to the addition of the correction factor, the READ_OUT_R quantity in the example above is b1 1101. Appending a 1 bit in the LSB position gives b11 1011. Appending two 0 bits thereto to bring the ROD_R to 8 bits results in b1110 1100. In this manner, the b100 correction factor is located in the middle of the possible range (from b000 to b111) of the correction factor, thereby resulting in a zero or low average error, over many pixels.

FIGS. 4 and 5 are flow charts illustrating an embodiment of the present invention, as applied to the YCbCr color space. Although not shown in FIGS. 4 and 5, U and V may be substituted for the designations Cb and Cr, respectively, in the case of the YUV color space. The source YCbCr pixel data is received in step S40. Step S41 calls for the determination of the source depth (SOD) per Y, Cb and Cr component. The source YCbCr pixel data may include, for illustrative and exemplary purposes only, 8 bits per color component per pixel, or 24 bits for all three color components. The SOD of the source YCbCr data, therefore, is the number of bits per color component. In the example introduced immediately above, therefore, the SOD for the source YCbCr pixel data is 8. In step S42, the stored depth (STD) per Y, Cb and Cr component is selected. According to the present invention, the STD is the number of bits per color component to be stored in the local graphics processor buffer, such as the DRAM 140 in FIG. 1. To lessen the memory size and bandwidth requirements of the system 100 (or a similar system to process graphics and/or digital video), the STD may be selected to be a smaller number than then SOD. For example, given an SOD of 8 bits, the STD may be selected to be a number smaller than 8, such as 5. The STD for each of the Y, Cb and Cr components may be identical or may be dissimilar from one another. For example, addressing within the graphics processor DRAM may be facilitated by selecting a 16-bit memory space to store the pixel data of the graphics image and/or to store the pixel data of the source YCbCr digital video stream. In that case, for example, the STD for the luminance component Y (hereafter STD_Y) may be selected to be 5 bits in length, the STD for the blue chrominance component Cb (hereafter STD_Cb) may also be selected to be 5 bits in length, whereas the STD for the red chrominance component Cr (hereafter STD_Cr) may be selected to be, for example, 4 bits in length. The sum of STD_Y, STD_Cb and STD_Cr, in this example, is 14 bits. If the pixel data is to be stored in a memory space 16 bits wide in the DRAM 140, this leaves 2 bits free to store some other special attribute. According to one embodiment of the present invention, this special attribute may be selected to represent pixel transparency data. The 2 bits of transparency data, therefore, allow for 4 transparency levels, ranging from 0% transparency (opaque) to 100% transparency (fully transparent). A greater number of transparency bits may be stored within the 16-bit memory space of the current example, but will require fewer bits to be stored to represent one or more of the color components. Alternatively, other pixel attributes may be stored in place of the transparency data. Step S43, therefore, call for the selection of the stored depth of the selected special attribute.

Steps S44–S46 may be carried out sequentially, in parallel, or in parallel across color components. Steps S44, S45 and S46 are similar, differing only in the color component being operated upon. Indeed, step S44 operates upon the pixel data for the luminance color component Y, step S45 operates upon the pixel data for the Cb color component whereas step S46 operates upon the pixel data for the Cr color component. Steps S44, S45 and S46 compress the source YCbCr pixel data and determine the pixel data to be stored in the memory 140 for each color component, in the following fashion. As shown in step S44, the Y component pixel data to be stored in the memory 140 (hereafter STORED_Y) is determined by taking the STD_Y LSB of the Y component source data after the Y component source pixel data is shifted by a number of bits equal to the difference of SOD_Y and STD_Y. Step S45 calls for the determination of the Cb component of the source data to be stored in the memory 140 (hereafter STORED_Cb) by taking the STD_Cb LSB of the Cb component source data after the Cb component source data is shifted by a number of bits equal to the difference of SOD_Cb and STD_Cb. Similarly, Step S46 calls for the determination of the Cb component of the source data to be stored in the memory 140 (hereafter STORED_Cb) by taking the STD_Cb LSB of the Cb component source data after the Cb component source data is shifted by a number of bits equal to the difference of SOD_Cb and STD_Cb. In step S47, the STORED_Y, STORED_Cb and STORED_Cr bits determined in steps S45, S46 and S47 respectively, are concatenated with the special attribute bits of step S43 as CONCAT_DATA bits. The CONCAT_DATA bits are then stored in the memory 140, as shown in step S48. Therefore, the CONCAT_DATA bits form the pixel data stored in memory.

For example, using the example of SOD_Y=SOD_Cb=SOD_Cr=8 bits, and STD_Y=5 bits, STD_Cb=5 bits, STD_Cr=4 bits and a stored depth for the transparency data of 2 bits, the pixel data for each color component, according to an embodiment of the present invention, may be determined as follows:

| | | |
|---|---|---|
| STORED_Y | = | 5 LSB of source Y bits right shifted by (SOD_Y − STD_Y); |
| | = | 5 LSB of source Y bits right shifted by (8 − 5); |
| | = | 5 LSB of source Y bits right shifted by 3 |

If, for example, the source Y bits are equal to the binary number b1110 1011, as in the example given relative to FIGS. 2 and 3, then the source Y bits, according to the present invention, will be compressed into the binary number represented by STORED_Y=5 LSB of (b1110 1011>>8−5). STORED_Y, therefore, equals 5 LSB (b0001 1101) or the binary number b1 1101. The source Y pixel data b1110 1011, therefore, may be bit-length reduced to b1 1101, concatenated with the selected special attribute bits (representing, for example, transparency data), and stored in the memory 140.

To display the compressed YCbCr pixel data, together with the transparency data, on a television monitor, computer monitor or other display device, it is necessary to retrieve the CONCAT_DATA pixel data bits from memory and to uncompress the retrieved pixel data for each of the Y, Cb and Cr color components. FIG. 5 is a flowchart illustrating a method of uncompressing the compressed pixel data stored in memory, according to an embodiment of the present invention. As shown therein, step S50 calls for the retrieval of the CONCAT_DATA pixel data bits from memory. In step S51, the read out depth for each Y, Cb and Cr color component (hereafter ROD_Y, ROD_Cb and ROD_Cr) is selected. According to an embodiment of the present invention, the ROD_Y=SOD_Y, ROD_Cb=SOD_Cb and ROD_Cr=SOD_Cr, although other implementations are possible within the scope of the present invention. Step S52 calls for the selection of the read out depth of the transparency data.

The retrieved color component data may then be uncompressed in the manner specified in steps S531, S532 and S533 of step S53. As shown in step S531, the pixel data to be read out per color component (referenced by READ_OUT_Y, READ_OUT_Cb and READ_OUT_Cr in FIG. 5) may be determined by left shifting the retrieved color component pixel data by a number of bits specified by the difference between the ROD and the STD for that color component and adding a correction factor thereto. The correction factor, according to the present invention, may be selected so that the uncompressed pixel data substantially matches the pixel data prior to compression. As shown in FIG. 5, the correction factor for the Cb and Cr color components may be selected to be zero. As shown in step S531 drawn to the uncompression of the stored Y component pixel data, the READ_OUT_Y bits may be determined by left shifting the bit quantity STORED_Y by a number of bits equal to (ROD_R−STD_Y) and adding a correction factor thereto equal to $2^{(ROD_{13}Y-STD\_Y-1)}$. Similarly, as shown in step S532 drawn to the uncompression of the stored Cb component pixel data, the READ_OUT_Cb bits may be determined by left shifting the bit quantity STORED_Cb by a number of bits equal to (ROD_Cb−STD_Cr). Lastly, as shown in step S533, drawn to the uncompression of the stored Cr component pixel data, the READ_OUT_Cr bits may be determined by left shifting the bit quantity STORED_Cr by a number of bits equal to (ROD_Cr−STD_Cr). The READ_OUT_Y, READ_OUT_Cb, READ_OUT_Cr and the transparency bits (or other special pixel data attribute) from step S52 may be input to an YCbCr television monitor, for example, after being suitably encoded (see FIG. 1, reference numeral 150).

Continuing with the example developed relative to FIG. 4, the STORED_Y bits (b1 1101) are retrieved as called for in step S50 and ROD_Y is selected to be 8 bits, to match the source depth SOD for the Y color component, although another read out depth may be selected. The READ_OUT_Y bits, in this example, would be determined by:

| | | |
|---|---|---|
| READ_OUT_Y | = | b1 1101 left shifted by (ROD_Y − STD_Y) + $2^{(ROD\_Y-STD\_Y-1)}$; |
| | = | b1 1101 left shifted by (8 − 5) + $2^{(8-5-1)}$; |
| | = | b1 1101 left shifted by 3 + b100; |
| | = | b1110 1000 + b100; |
| | = | b1110 1100 |

Therefore, the source pixel data for the Y color component of b1110 1011 (decimal 235) has been compressed and stored (FIG. 4) and uncompressed (FIG. 5) to a value of b1110 1100(decimal 236) that is very close to its original magnitude. Therefore, the original 24-bit (8 bit per color component) pixel data and the 2 bit transparency data (four transparency levels) has been compressed to fit within a 16-bit memory space and uncompressed to a value that is very close to its magnitude prior to compression. Although the method disclosed above may not restore the same pixel values before and after compression, the difference between the pixel values before and after compression are believed to be sufficiently small as to be scarcely noticeable or not noticeable at all in the displayed graphics image or digital video. As noted above, the correction factor may (but need not be) zero for the Cb (or U) and for the Cr (or V) color components. This, however, does not unduly impair the quality of the uncompressed graphics image or video image as the human eye is more sensitive to the luminance component (Y) of the YCbCr image than it is to the chrominance components (Cb, Cr or U, V). Therefore, small variations in the chrominance components are unlikely to unduly detract from the rendered image. Moreover, due to the nature of the range of values representing Cb and Cr color components (i.e., ranging from negative to positive values), adding a correction factor to the Cb and Cr color components may add color where none existed prior to compression. It is preferable, according to the present invention, not to add a correction factor to the Cb and Cr color components during the uncompression process.

Significantly, the present invention allows the accurate compression and uncompression of graphics and/or digital video data, with little or no loss of fidelity relative to the original graphics and/or video data prior to compression. The memory and bandwidth required to buffer and to process the graphics data and/or frames of video data at the required data rate is decreased.

While the foregoing detailed description has described certain embodiments of the present invention, it is to be understood that the above description is illustrative only and not limiting of the disclosed invention. For example, other correction factors may be implemented to achieve a like functionality without, however, departing from the scope and spirit of the present invention. Other modifications may occur to those of skill in this art. Accordingly, the present invention to be limited only by the claims as set forth below.

What is claimed is:

1. A method of processing graphics or digital video data, comprising the steps of:
   determining a source depth of each color component of each pixel of the data;
   for said each pixel, carrying out the steps of:
      selecting a stored depth of each color component of the pixel;
      selecting a non-zero stored depth of a special attribute for the pixel;
      compressing the color components of the pixel by carrying out the steps of:
         performing a right shifting operation on each group of bits representing each color component by right shifting by a first number of bits equal to a difference between the source depth and the stored depth;
         transforming each right shifted group of bits by stripping all but a second number of least significant bits from each right shifted group, the second number being equal to the stored depth; and
         assigning a third non-zero number of bits to the special attribute, the third number being no greater than the selected stored depth of the special attribute;
         concatenating each of the compressed color components of the pixel and the special attribute as concatenated pixel data and
         storing the concatenated pixel data in a memory.

2. The processing method of claim 1, further including the steps of:
   retrieving the concatenated pixel data from the memory; and
   uncompressing the retrieved concatenated pixel data by left shifting each transformed group of the compressed data by a fourth number of bits and adding a correction factor thereto, the fourth number being equal to a difference between a selected read out depth and the stored depth.

3. The processing method of claim 2, wherein the correction factor is selected so that the uncompressed data substantially matches the data prior to compression.

4. The processing method of claim 2, wherein the correction factor is equal to a fifth number, the fifth number being equal to one of zero and 2 raised to the difference between the selected read out depth and the stored depth.

5. The processing method of claim 1, wherein the read out depth is selected to be equal to the source depth of the data.

6. The processing method of claim 1, wherein a color space of the data is RGB, and wherein the determining, selecting, compressing and storing steps are carried out for each of the R, G and B color components of the data.

7. The processing method of claim 1, wherein a color space of the data is YCbCr and wherein the determining, selecting, compressing and storing steps are carried out for each of the Y, Cb and Cr color components of the data.

8. The processing method of claim 2, wherein a color space of the data is one of YUV and YCbCr and wherein the correction factor for the Cb, Cr, U and V components is zero.

9. The processing method of claim 1, wherein the special attribute represents pixel transparency data.

10. Method of processing 24-bit digital video or graphics data including a plurality of pixels, comprising the steps of:
   allocating a 16-bit memory space of a memory to store each pixel of the 24-bit data;
   reducing a bit length of each color component of each pixel of the 24 bit data by right shifting;
   allocating at least two bits within the 16-bit memory space to represent a transparency attribute having at least four transparency gradations, the transparency attribute being distinct from the three bit-length reduced color components of each pixel of the 24-bit data;

concatenating the bit length-reduced color components of each pixel and the transparency attribute as concatenated pixel data, and storing the concatenated pixel data in the 16-bit memory space.

11. The method of claim 10, wherein a color space of the 24-bit data is RGB, wherein the bit length reducing step reduces an 8-bit red color component of the 24-bit data to 5 bits, an 8-bit green color component of the 24-bit data to 5 bits and an 8-bit blue color component of the 24-bit data to 4 bits and wherein the allocating step allocates 2 bits to the transparency attribute.

12. The method of claim 10, wherein a color space of the 24-bit data is RGB, wherein the bit length reducing step reduces an 8-bit red color component of the 24-bit data to 4 bits, an 8-bit green color component of the 24-bit data to 5 bits and an 8-bit blue color component of the 24-bit data to 4 bits and wherein the allocating step allocates 3 bits to the transparency attribute.

13. The method of claim 10, wherein a color space of the 24-bit data is RGB, wherein the bit length reducing step reduces an 8-bit red color component of the 24-bit data to 4 bits, an 8-bit green color component of the 24-bit data to 5 bits and an 8-bit blue color component of the 24-bit data to 3 bits and wherein the allocating step allocates 4 bits to the transparency attribute.

14. The method of claim 10, wherein a color space of the 24-bit data is YCbCr, wherein the bit length reducing step reduces an 8-bit Y color component of the 24-bit data to 5 bits, an 8-bit Cb color component of the 24-bit data to 5 bits and an 8-bit Cr color component of the 24-bit data to 4 bits and wherein the allocating step allocates 2 bits to the transparency attribute.

15. The method of claim 10, wherein a color space of the 24-bit data is YCbCr, wherein the bit length reducing step reduces an 8-bit Y color component of the 24-bit data to 5 bits, an 8-bit Cb color component of the 24-bit data to 4 bits and an 8-bit Cr color component of the 24-bit data to 5 bits and wherein the allocating step allocates 2 bits to the transparency attribute.

16. The method of claim 10, wherein a color space of the 24-bit data is YCbCr, wherein the bit length reducing step reduces an 8-bit Y color component of the 24-bit data to 6 bits, an 8-bit Cb color component of the 24-bit data to 4 bits and an 8-bit Cr color component of the 24-bit data to 4 bits and wherein the allocating step allocates 2 bits to the transparency attribute.

17. The method of claim 10, wherein a color space of the 24-bit data is YCbCr, wherein the bit length reducing step reduces an 8-bit Y color component of the 24-bit data to 6 bits, an 8-bit Cb color component of the 24-bit data to 4 bits and an 8-bit Cr color component of the 24-bit data to 3 bits and wherein the allocating step allocates 3 bits to the transparency attribute.

18. The method of claim 10, wherein color space of the 24-bit data is YCbCr, wherein the bit length reducing step reduces an 8-bit Y color component of the 24-bit data to 6 bits, an 8-bit Cb color component of the 24-bit data to 3 bits and an 8-bit Cr color component of the 24-bit data to 4 bits and wherein the allocating step allocates 3 bits to the transparency attribute.

19. The method of claim 10, wherein a color space is RGB and wherein the method further includes the steps of:

reading the bits stored in the 16 bit memory space;

appending a 1 bit to the bits read from memory in a least significant bit position, and appending at least one 0 bit to the appended 1 bit.

20. The method of claim 10, wherein a color space is YCbCr and wherein the method further includes the steps of:

reading the bits stored in the 16 bit memory space;

appending, for the bits representing the color component corresponding to a Y component, a 1 bit to the bits read from memory in a least significant bit position and appending at least one 0 bit to the appended 1 bit, and appending, for the respective bits representing the color component corresponding to the Cb and Cr components, at least two 0 bits to the bits read from memory in a least significant bit position.

21. A three color component digital video and/or graphics data processing device, comprising:

a digital video and graphics data receiver, the receiver being adapted to receive data having a first number of bits assigned to transparency data and a second number of bits assigned to each of the three color components of the received data, the received data comprising a plurality of pixels, the first number of bits assigned to transparency data being at least equal to two;

dynamic random access memory; and a graphics processor coupled to the receiver and to the memory, the graphics processor including logic to carry out the following steps for each pixel of the received data:

compress the data received from the receiver by right shifting to reduce a number of bits allocated to represent pixel data in each of the three color components;

store the transparency data and the compressed data in the memory;

selectively retrieve the stored data from memory, and uncompress the retrieved data by selectively appending at least two least significant bits onto the retrieved data for each of the three color components, the appended bits representing a correction factor selected so that the uncompressed data substantially matches the data prior to compression.

22. The device of claim 21, wherein the first number is at least 2 and the second number is 8 and wherein the graphics processor includes logic to store the transparency data and all three-color components of the pixel data in a 16-bit memory space within the memory.

23. The device of claim 21, wherein a color space of the received data is RGB and wherein the correction factor for each of the three color components includes a 1 bit in a most significant position of the appended bits, followed by at least one 0 bit.

24. The device of claim 21, wherein a color space of the received data is one of YUV and YCbCr and wherein the correction factor includes, for a Y color component, a 1 bit in a most significant position of the appended bits followed by at least one 0 bit and includes, for the U, Cb or the V, Cr color components, at least two 0 bits.

* * * * *